US012547253B2

(12) United States Patent
Jun et al.

(10) Patent No.: US 12,547,253 B2
(45) Date of Patent: Feb. 10, 2026

(54) KEYBOARD DEVICE AND ELECTRONIC DEVICE CONNECTED WITH KEYBOARD DEVICE

(71) Applicant: Samsung Electronics Co., Ltd., Suwon-si (KR)

(72) Inventors: Intae Jun, Suwon-si (KR); Woojin Seo, Suwon-si (KR); Daehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/953,610

(22) Filed: Nov. 20, 2024

(65) Prior Publication Data

US 2025/0165081 A1 May 22, 2025

Related U.S. Application Data

(63) Continuation of application No. PCT/KR2024/018401, filed on Nov. 20, 2024.

(30) Foreign Application Priority Data

Nov. 21, 2023 (KR) .................. 10-2023-0162573
Dec. 28, 2023 (KR) .................. 10-2023-0195473

(51) Int. Cl.
*G06F 3/023* (2006.01)
*G06F 3/0354* (2013.01)

(52) U.S. Cl.
CPC .......... *G06F 3/023* (2013.01); *G06F 3/03547* (2013.01)

(58) Field of Classification Search
CPC ........ G06F 3/02; G06F 3/0213; G06F 3/0219; G06F 3/0227; G06F 3/023; G06F 3/0231;
(Continued)

(56) References Cited

U.S. PATENT DOCUMENTS 6,005,876 A 12/1999 Cimini, Jr. et al.
6,028,538 A 2/2000 Ramesh et al.
(Continued)

FOREIGN PATENT DOCUMENTS

CN 216697209 U 6/2022
CN 219960618 U * 11/2023 .............. H04M 1/02
(Continued)

OTHER PUBLICATIONS

International Search Report dated Mar. 10, 2025, issued in International Application No. PCT/KR2024/018401.

*Primary Examiner* — Franklin D Balseca
(74) *Attorney, Agent, or Firm* — Jefferson IP Law, LLP

(57) ABSTRACT

A keyboard device includes a key array, a power terminal, a communication terminal, a ground terminal, memory storing one or more computer programs, and one or more processors communicatively coupled to the power terminal, the communication terminal, the ground terminal, and the memory, wherein the one or more computer programs include computer-executable instructions that, when executed by the one or more processors individually or collectively, cause the keyboard device to detect electrical connection to an external electronic device through the power terminal, the communication terminal, and the ground terminal, when electrically connected to the external electronic device, receive a key input through the key array, in response to the key input, generate first encoded data having a first error correction rate and second encoded data having a second error correction rate greater than the first error correction rate, combine the first encoded data and the second encoded data to generate input data, and transmit the input data to the external electronic device through the communication terminal.

20 Claims, 14 Drawing Sheets

(58) Field of Classification Search
CPC ... G06F 3/03547; H03M 11/00; H03M 11/02; H03M 11/20; H03M 11/22
See application file for complete search history.

(56) References Cited

U.S. PATENT DOCUMENTS

| | | |
|---|---|---|
| 6,839,830 B2 | 1/2005 | Liu |
| 6,980,498 B2 | 12/2005 | Sako |
| 7,075,941 B2 | 7/2006 | Liu |
| 7,082,564 B2 | 7/2006 | Fredrickson et al. |
| 7,111,222 B2 | 9/2006 | Takagi et al. |
| 7,296,209 B2 | 11/2007 | Katayama et al. |
| 7,493,546 B2 | 2/2009 | Takagi et al. |
| 7,653,866 B2 | 1/2010 | Takagi et al. |
| 7,694,204 B2 | 4/2010 | Schmidt et al. |
| 7,708,698 B2 | 5/2010 | Wu et al. |
| 7,818,748 B2 | 10/2010 | Liu |
| 7,920,602 B2 | 4/2011 | Park et al. |
| 7,937,644 B2 | 5/2011 | Schmidt et al. |
| 8,020,049 B2 | 9/2011 | Asuncion et al. |
| 8,099,648 B2 | 1/2012 | Schmidt et al. |
| 8,130,798 B2 | 3/2012 | Park et al. |
| 8,135,044 B2 | 3/2012 | Park et al. |
| 8,194,705 B2 | 6/2012 | Park et al. |
| 8,325,751 B2 | 12/2012 | Liu |
| 8,522,284 B2 | 8/2013 | Song et al. |
| 8,615,703 B2 | 12/2013 | Eisenhuth et al. |
| 8,640,012 B2 | 1/2014 | Ling et al. |
| 9,380,354 B2 | 6/2016 | Kwak et al. |
| 9,411,675 B2 | 8/2016 | Eisenhuth et al. |
| 9,990,091 B2 | 6/2018 | Cheong et al. |
| 9,996,131 B2 | 6/2018 | Srivastava |
| RE47,462 E | 6/2019 | Song et al. |
| 10,405,061 B2 | 9/2019 | Kwak et al. |
| 10,740,173 B2 | 8/2020 | Eisenhuth et al. |
| 11,632,815 B2 * | 4/2023 | Ahmed ................ G06F 3/0202 455/41.2 |
| 11,658,684 B2 | 5/2023 | Santhanam et al. |
| 11,870,246 B2 | 1/2024 | Goyal et al. |
| 2004/0054651 A1 | 3/2004 | Katayama et al. |
| 2004/0059989 A1 | 3/2004 | Fredrickson et al. |
| 2004/0139380 A1 | 7/2004 | Sako |
| 2006/0262863 A1 | 11/2006 | Park et al. |
| 2007/0004988 A1 | 1/2007 | Wu et al. |
| 2009/0067548 A1 | 3/2009 | Song et al. |
| 2009/0271686 A1 | 10/2009 | Jiang et al. |
| 2009/0271688 A1 | 10/2009 | Jiang et al. |
| 2010/0162054 A1 | 6/2010 | Asuncion et al. |
| 2013/0311956 A1 | 11/2013 | Li |
| 2014/0055360 A1 | 2/2014 | Liang |
| 2014/0120861 A1 | 5/2014 | Kwak et al. |
| 2016/0378222 A1 | 12/2016 | Cheong et al. |
| 2017/0123470 A1 | 5/2017 | Srivastava |
| 2017/0228041 A1 | 8/2017 | Li |
| 2020/0303920 A1 | 9/2020 | Goyal et al. |
| 2022/0294444 A1 | 9/2022 | Liu et al. |
| 2022/0302929 A1 | 9/2022 | Santhanam et al. |
| 2024/0097437 A1 | 3/2024 | Goyal et al. |

FOREIGN PATENT DOCUMENTS

| | | |
|---|---|---|
| EP | 1 021 758 B1 | 1/2002 |
| JP | 2011-109316 A | 6/2011 |
| KR | 10-2002-0006790 A | 1/2002 |
| KR | 10-2004-0023665 A | 3/2004 |
| KR | 10-2013-0050335 A | 5/2013 |
| KR | 10-2013-0133745 A | 12/2013 |

* cited by examiner

KEYBOARD DEVICE AND ELECTRONIC DEVICE CONNECTED WITH KEYBOARD DEVICE

CROSS-REFERENCE TO RELATED APPLICATION(S)

This application is a continuation application, claiming priority under § 365(c), of an International application No. PCT/KR2024/018401, filed on Nov. 20, 2024, which is based on and claims the benefit of a Korean patent application number 10-2023-0162573, filed on Nov. 21, 2023, in the Korean Intellectual Property Office, and of a Korean patent application number 10-2023-0195473, filed on Dec. 28, 2023, in the Korean Intellectual Property Office, the disclosure of each of which is incorporated by reference herein in its entirety.

TECHNICAL FIELD

The disclosure relates to a keyboard device and an electronic device connecting the keyboard device.

BACKGROUND ART

Electronic devices (or portable communication devices) such as smartphones and tablet personal computers (PCs) may be connected to and used as keyboard devices. A keyboard device may be a device that receives input that occurs when a user presses a key such as a letter, number, or symbol, and transmits information about the key pressed by the user to an electronic device. The electronic device may display information corresponding to the key on a display or perform a related function based on the information it has received from the keyboard device.

The keyboard device may include a touch pad. For example, the keyboard device may include the touch pad below the key buttons (closer to the user). The electronic device may move a cursor displayed on the display in response to the movement of a user's touch input occurring on the touch pad.

The keyboard device may be used by being wirelessly connected to an electronic device, or may be used by physically contacting one side of the electronic device. For example, the keyboard device may be in physical contact with and electrically connected to an electronic device through a power terminal and a communication terminal. The keyboard device may transmit data related to a key input to the electronic device through 1-wire communication.

The above information is presented as background information only to assist with an understanding of the disclosure. No determination has been made, and no assertion is made, as to whether any of the above might be applicable as prior art with regard to the disclosure.

DISCLOSURE OF THE INVENTION

Aspects of the disclosure are to address at least the above-mentioned problems and/or disadvantages and to provide at least the advantages described below. Accordingly, an aspect of the disclosure is to provide a keyboard device and electronic device connected with keyboard device.

Additional aspects will be set forth in part in the description which follows and, in part, will be apparent from the description, or may be learned by practice of the presented embodiments.

In accordance with an aspect of the disclosure, a keyboard device includes a key array, a power terminal, a communication terminal, a ground terminal, memory storing one or more computer programs, and one or more processors communicatively coupled to the key array, the power terminal, the communication terminal, the ground terminal, and the memory, wherein the one or more computer programs include computer-executable instructions that, when executed by the one or more processors individually or collectively, cause the keyboard device to detect electrical connection to an external electronic device through the power terminal, the communication terminal, and the ground terminal, when electrically connected to the external electronic device, receive a key input through the key array, in response to the key input, generate first encoded data having a first error correction rate and second encoded data having a second error correction rate greater than the first error correction rate, combine the first encoded data and the second encoded data to generate input data, and transmit the input data to the external electronic device through the communication terminal.

In accordance with another aspect of the disclosure, an electronic device includes a display, a power terminal, a communication terminal, a ground terminal, memory storing one or more computer programs, and one or more processors communicatively coupled to the display, the power terminal, the communication terminal, the ground terminal, and the memory, wherein the one or more computer programs include computer-executable instructions that, when executed by the one or more processors individually or collectively, cause the electronic device to detect electrical connection to an external keyboard device through the power terminal, the communication terminal, and the ground terminal, when electrically connected to the external keyboard device, receive input data from the external keyboard device, separate a first error correction code having a first error correction rate and a second error correction code having a second error correction rate from the input data, within a specified time interval, decode the first error correction code and output key data based on first data when a first key value is valid, and output key data based on second data within the specified time interval when the first key value is invalid.

In accordance with another aspect of the disclosure, one or more non-transitory computer-readable storage media storing computer-executable instructions that, when executed by a processor individually or collectively, cause an electronic device to perform operations are provided. The operations include detecting electrical connection to an external keyboard device through a power terminal, a communication terminal, and a ground terminal, when electrically connected to the external keyboard device, receiving input data from the external keyboard device, separating a first error correction code having a first error correction rate and a second error correction code having a second error correction rate from the input data, within a specified time interval, decoding the first error correction code and output key data based on first data when a first key value is valid, and outputting key data based on second data within the specified time interval when the first key value is invalid.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
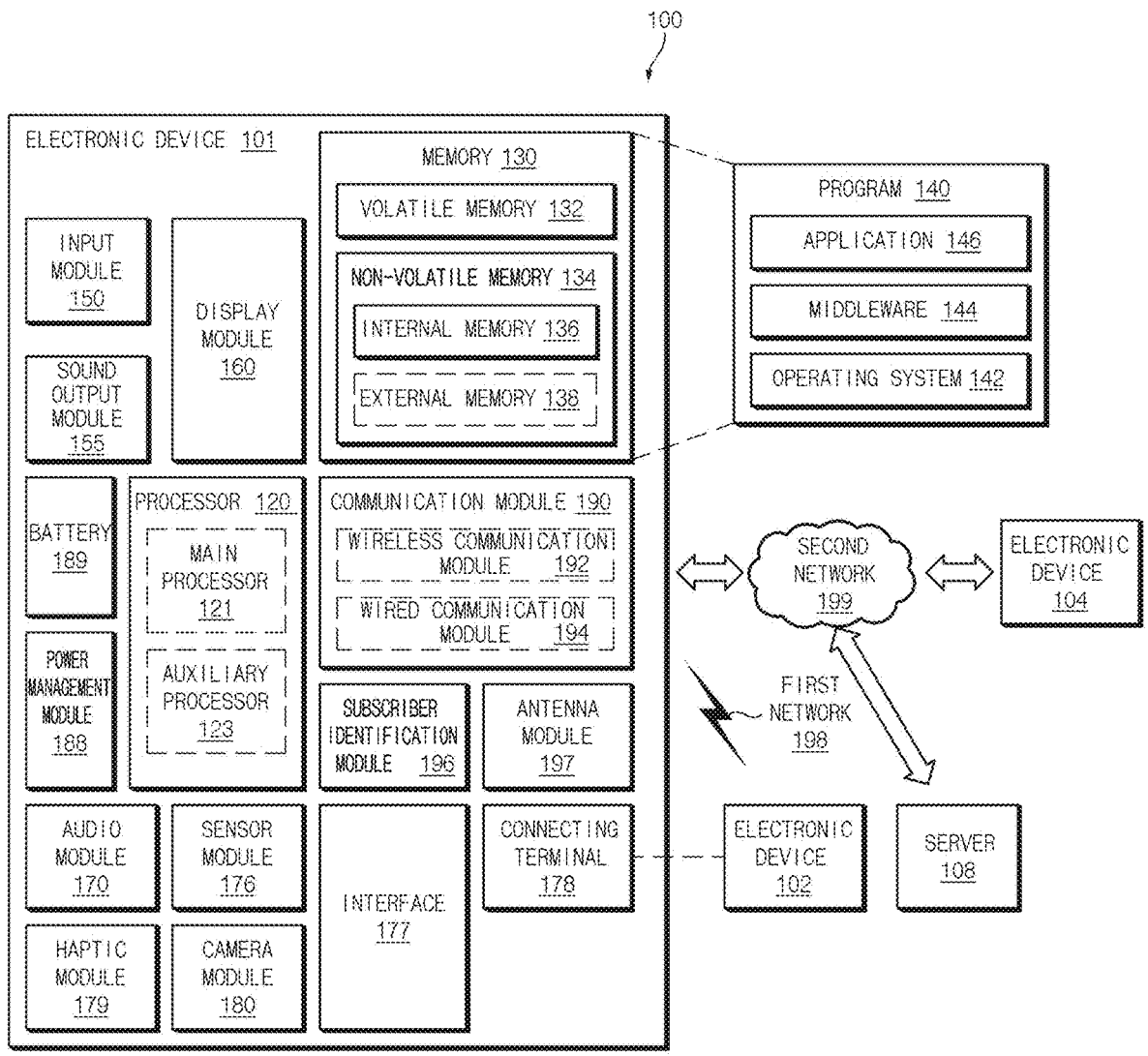
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
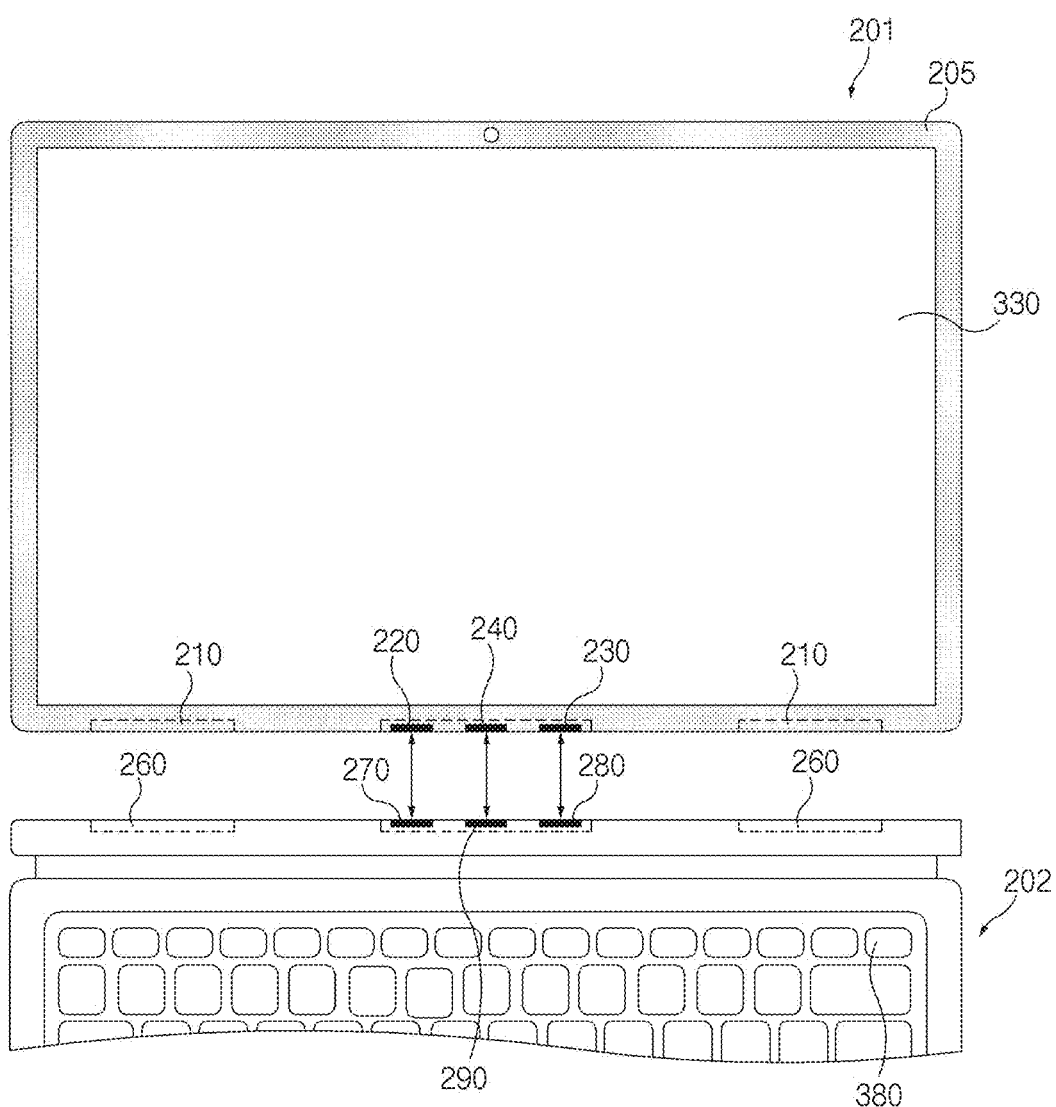
FIG. 2 illustrates an electronic device and a keyboard device according to an embodiment of the disclosure.

FIG. 2 illustrates an electronic device and a keyboard device according to an embodiment of the disclosure.

Referring to FIG. 2, an electronic device 201 (e.g., the electronic device 101 in FIG. 1) may include a housing 205 and a display 330 (e.g., the display module 160 in FIG. 1). The electronic device 201 may include various components (e.g., a processor (e.g., the processor 120 in FIG. 1), memory (e.g., the memory 130 in FIG. 1), a printed circuit board, a camera module (e.g., the camera module 180 of FIG. 1), and a communication circuit (e.g., the communication module 190 in FIG. 1), inside the housing 205. For example, the electronic device 201 may be a tablet PC.

A keyboard device 202 may be a device that receives input from a user pressing a key such as a letter, number, or symbol, and transmits information about the key pressed by the user to the electronic device 201. The electronic device 201 may display text corresponding to a key input made by the user on the display 330 based on information received from the keyboard device 202 or perform a function related to the input key. For example, the keyboard device 202 may be a book cover that includes keyboard functionality.

The keyboard device 202 may be used by being physically coupled to and in contact with the electronic device 201. For example, one side of the electronic device 201 may be physically coupled to one side of the keyboard device 202 (e.g., coupled by a magnetic force) to be electrically connected (e.g., contact between terminals).

According to one embodiment of the disclosure, the electronic device 201 may include, as components for coupling or connecting to the keyboard device 202, a first coupling member 210, a first power terminal 220, and a first ground terminal 230, and a first communication terminal 240 on one side thereof. In addition, the keyboard device 202 may include, as components for coupling or connecting to the electronic device 201, a second coupling member 260, a second power terminal 270, a second ground terminal 280, and a second communication terminal 290 on one side thereof.

The first coupling member 210 may be coupled to the second coupling member 260 by a magnetic force. For example, one of the first coupling member 210 and the second coupling member 260 may be a magnet, and the other may be made of a metal material. For another example, the first coupling member 210 and the second coupling member 260 may each be a magnet, and may be arranged so that their different poles face each other.

The first coupling member 210 and the second coupling member 260 may each be plural and may be arranged in the same number. When the first coupling member 210 and the second coupling member 260 are coupled, the first power terminal 220, the first ground terminal 230, and the first communication terminal 240 may be in contact with the second power terminal 270, the second ground terminal 280 and the second communication terminal 290, respectively.

The electronic device 201 may supply a power signal to the keyboard device 202 through the first power terminal 220 and the second power terminal 270. Through the first ground terminal 230 and the second ground terminal 280, the ground of the keyboard device 202 may be integrated with the ground of the electronic device 201.

The electronic device 201 may perform 1-wire communication with the keyboard device 202 through the first communication terminal 240 and the second communication terminal 290. 1-wire communication may be half-duplex type bidirectional communication. For example, when the user presses a key of a key array 380, the keyboard device 202 may transmit key data and data related to error correction to the electronic device 201 through 1-wire communication.

According to one embodiment of the disclosure, when electric fast transient (EFT)/burst related to power is applied to the electronic device 201 or the keyboard device 202 at an arbitrary time, both the first power terminal 220 of the electronic device 201 and the second power terminal 270 of the keyboard device 202 may momentarily become unstable. Accordingly, serious errors in data related to key input may occur. The electronic device 201 or the keyboard device 202 may prevent key input errors caused by EFT/burst by using data having a plurality of different error correction rates. Additional information regarding the use of data with a plurality of different error correction rates may be provided through FIGS. 3 to 14 below.

Although not shown in FIG. 2, the keyboard device 202 may include a touch pad. When a user input occurs on the touch pad, the keyboard device 202 may transmit data corresponding to the user's touch input to the electronic device 201. The electronic device 201 may move a cursor displayed on the display 330 in response to the touch input.

Figure 3:
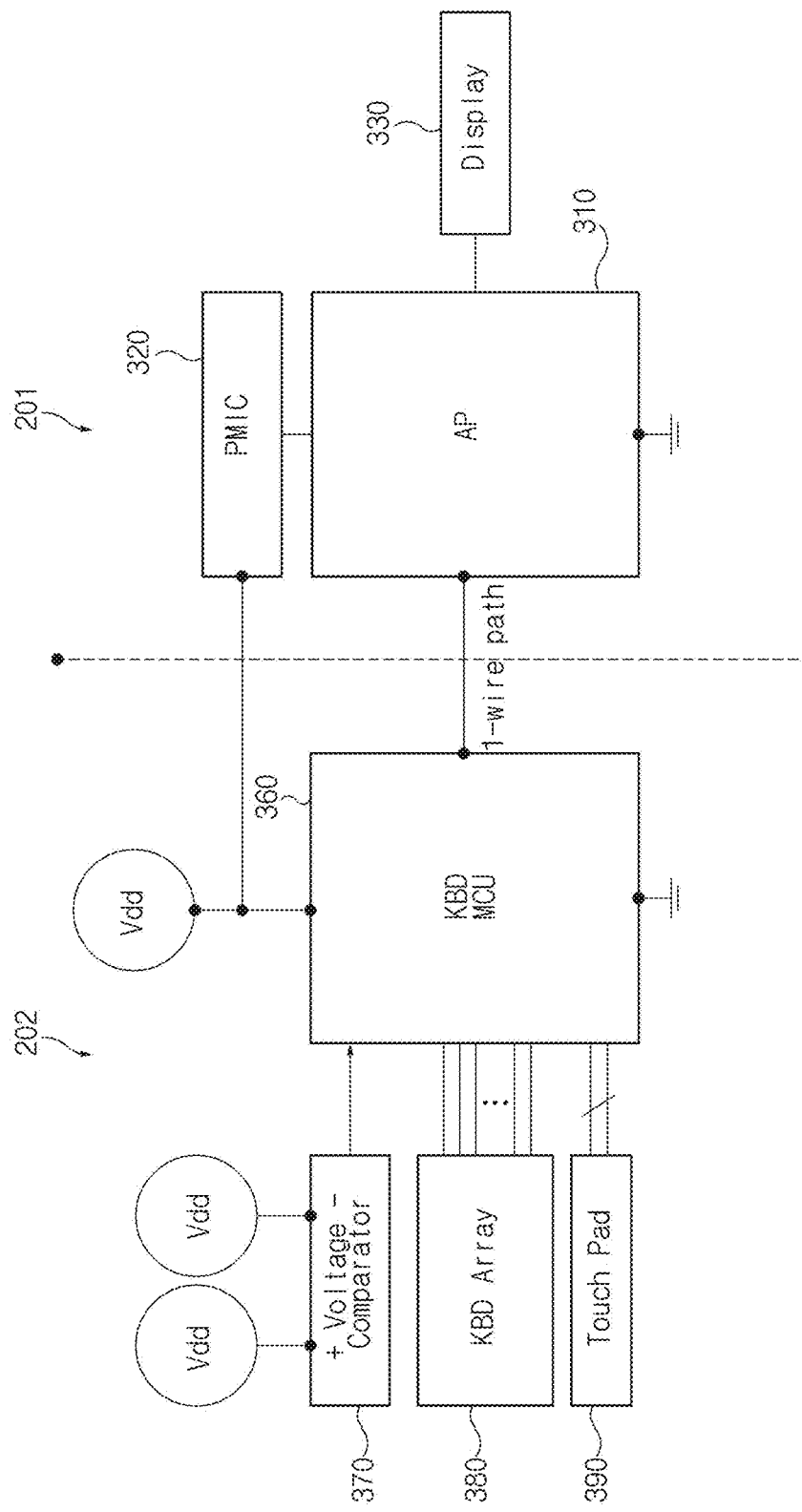
FIG. 3 is a block diagram of an electronic device and a keyboard device according to an embodiment of the disclosure.

FIG. 3 is a block diagram of an electronic device and a keyboard device according to an embodiment of the disclosure.

FIG. 3 is a diagram mainly illustrating a configuration related to the key input and is not limited thereto.

Referring to FIGS. 2 and 3, the electronic device 201 may include a processor 310, a power supply unit 320, and a display 330.

The processor (e.g., the processor 120 in FIG. 1) (hereinafter referred to as a terminal processor) 310 may perform various operations required for the operation of the electronic device 201. For example, the terminal processor 310 may be an application processor (AP).

The power supply unit (e.g., the power management module 188 in FIG. 1) 320 may supply power required to drive the electronic device 201. The power supply unit 320 may be connected to a battery or an external power device. The power supply unit 320 may supply power to the keyboard device 202 through the first power terminal 220 and the second power terminal 270 (e.g., Vdd=5 V).

The display (e.g., the display module 160 in FIG. 1) 330 may visually display various information such as text, images, or icons. For example, when one in the key array 380 of the keyboard device 202 is pressed, the display 330 may display corresponding text.

The keyboard device 202 may include a processor 360, a voltage comparator 370, the key array 380, and a touch pad 390.

The processor (hereinafter referred to as a keyboard processor) 360 may perform operations related to the key input or touch input. For example, the keyboard processor 360 may be a micro controller unit (MCU).

The keyboard processor 360 may receive data about keys pressed by the user in the key array 380 and encode the data. The keyboard processor 360 may transmit the encoded key data to the electronic device 201. When a touch input occurs on the touch pad 390, the keyboard processor 360 may transmit data corresponding to the touch input to the electronic device 201.

The voltage comparator 370 has a first input (+ input) for receiving a power signal of the second power terminal 270 and a second input (− input) for receiving a power signal provided by inverting the power signal of the second power terminal 270. The voltage comparator 370 may compare the first input and the second input and transmit a resulting value to the keyboard processor 360. The keyboard processor 360 may detect appliance of EFT/B based on the resulting value transmitted from the voltage comparator 370.

According to one embodiment of the disclosure, the keyboard processor 360 may generate error correction data by a specified coding technique in which original data is preserved, for example, a Reed Solomon (RS) coding technique. When electric fast transient (EFT)/burst related to power is applied at an arbitrary time, both the first power terminal 220 of the electronic device 201 and the second power terminal 270 of the keyboard device 202 may momentarily become unstable. Accordingly, serious errors in data related to key input may occur. The electronic device 201 or the keyboard device 202 may generate data having a plurality of different error correction rates using the RS coding technique. The RS coding technique may correct errors related to burst errors using the properties of polynomials. For example, the RS coding technique may include Bose-Chaudhuri-Hocquenghem (BCH) coding. BCH coding may increase the error correction rate when the coefficient/order before the original key data is increased, and may lower the error correction rate when the coefficient/order before the original key data is decreased.

Figure 4:
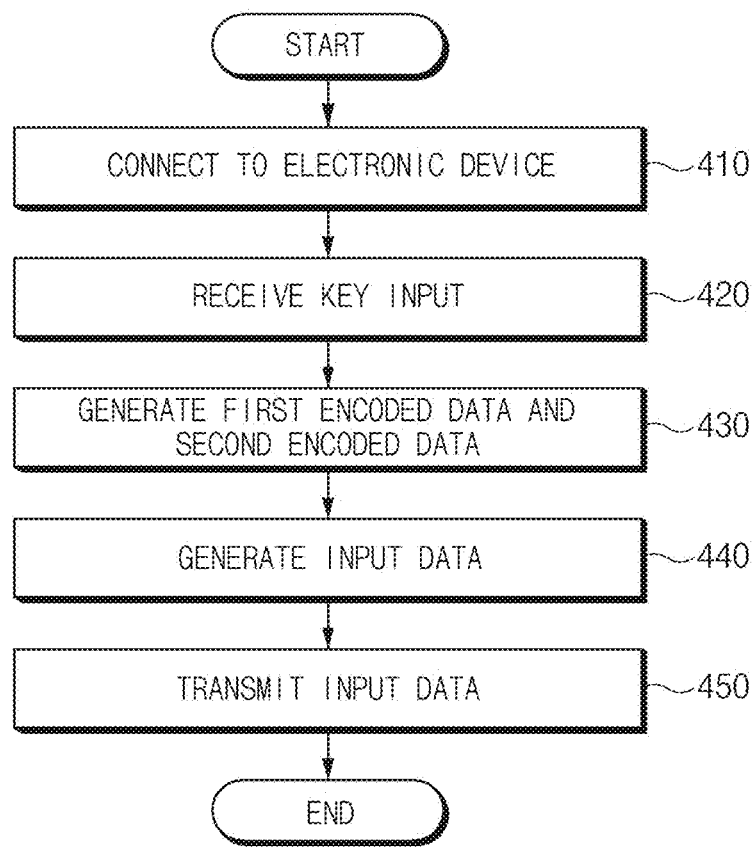
FIG. 4 is a flowchart showing operations of a keyboard processor according to an embodiment of the disclosure.

FIG. 4 is a flowchart showing operations of a keyboard processor according to an embodiment of the disclosure.

Referring to FIGS. 2, 3, and 4, in operation 410, the keyboard processor 360 may check whether the keyboard device 202 is electrically connected to the electronic device 201. For example, in FIG. 2, when the first coupling member 210 and the second coupling member 260 are coupled, the first power terminal 220, the first ground terminal 230, and the first communication terminal 240 may be in contact with the second power terminal 270, the second ground terminal 280 and the second communication terminal 290, respectively. The keyboard processor 360 may perform 1-wire communication with the terminal processor 310 of the electronic device 201 through the first communication terminal 240 and the second communication terminal 290.

In operation 420, the keyboard processor 360 may receive a user input (hereinafter referred to as a key input) provided when pressing at least one key from the key array 380. Hereinafter, a case where the "A" key is pressed is discussed as an example, but the pressing is not limited thereto.

In operation 430, the keyboard processor 360 may generate first encoded data having a first error correction rate and second encoded data having a second error correction rate in response to the key input. For example, the first error correction rate may be 10% and the second error correction rate may be 30%.

In operation 440, the keyboard processor 360 may generate input data by combining the first encoded data and the second encoded data. The keyboard processor 360 may separate error correction data excluding header and key data from the second encoded data. The keyboard processor 360 may generate the input data by combining error correction data of the first encoded data and error correction data of the second encoded data (see FIGS. 5 and 6).

In operation 450, the keyboard processor 360 may transmit the input data to the electronic device 201 through a 1-wire communication channel formed through the first communication terminal 240 and the second communication terminal 290.

According to one embodiment of the disclosure, the terminal processor 310 may receive the input data, primarily process the key input by reflecting the first error correction rate (e.g., 10%), and secondarily process the key input by reflecting the second error correction rate (e.g., 30%) when a key value according to the first error correction rate is invalid. Additional information regarding operations of the terminal processor 310 may be provided through FIG. 7.

Figure 5:
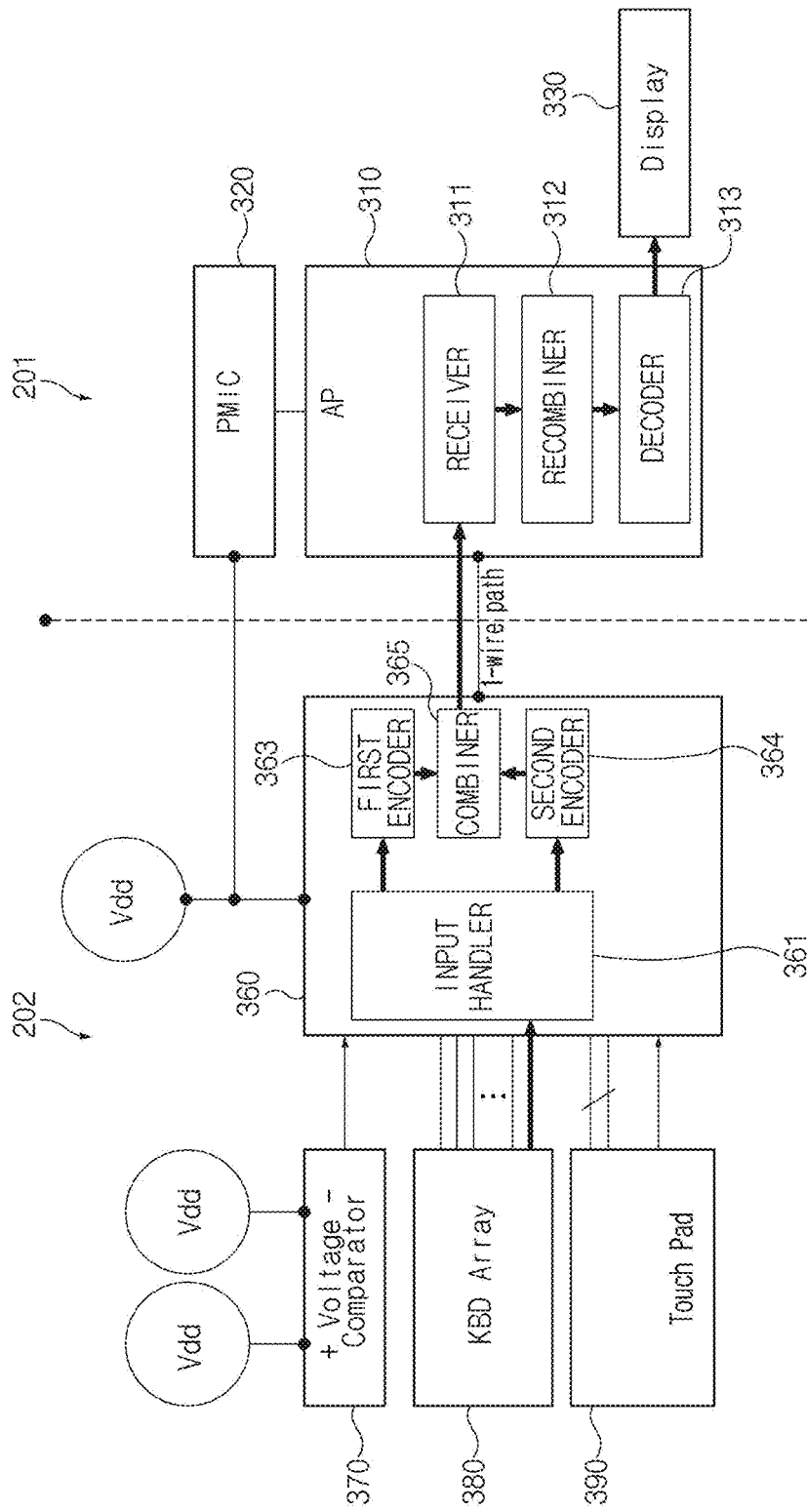
FIG. 5 is a block diagram of the keyboard processor and a terminal processor according to an embodiment of the disclosure.

FIG. 5 is a block diagram of a keyboard processor and a terminal processor according to an embodiment of the disclosure.

FIG. 5 classifies internal components of the keyboard processor and the terminal processor according to their functions, and is not limited thereto.

Referring to FIGS. 4 and 5, the keyboard processor 360 may include an input handler 361, a first encoder 363, a second encoder 364, and a combiner 365. The internal components of the keyboard processor 360 may be classified in terms of software.

The input handler 361 may perform an interface with the key array 380 or the touch pad 390. For example, the input handler 361 may receive data about a key input from the key array 380 or receive data about a touch input from the touch pad 390.

The first encoder 363 may generate first encoded data having a first error correction rate based on data about key input. For example, the first error correction rate may be a relatively low value (e.g., 10%).

The second encoder 364 may generate second encoded data having a second error correction rate based on data about key input. For example, the second error correction rate may be a relatively high value (e.g., 30%).

The combiner (or transmitter) 365 may generate input data by combining the first encoded data having the first error correction rate and the second encoded data having the second error correction rate. For example, the combiner 365 may separate an error correction code excluding a header and key data from the second encoded data. The combiner 365 may generate input data by combining the error correction codes of the first encoded data and the second encoded data (see FIG. 6). The combiner 365 may transmit the generated input data to the terminal processor 310 through 1-wire communication.

The terminal processor 310 may include a receiver 311, a recombiner 312, and a decoder 313. The internal components of the terminal processor 310 may be classified in terms of software.

The receiver 311 may receive the input data from the keyboard processor 360 of the keyboard device 202 through 1-wire communication. The input data may be data in which both the first error correction rate and the second error correction rate are reflected.

The recombiner 312 may separate a first error correction code corresponding to the first error correction rate and a second error correction code corresponding to the second error correction rate from the input data.

The decoder 313 may decode the first error correction code and the second error correction code. The terminal processor 310 may primarily process the key input by reflecting the first error correction rate and secondarily process the key input by reflecting the second error correction rate when a key value according to the first error correction rate is invalid (see FIGS. 7 and 9).

Figure 6:
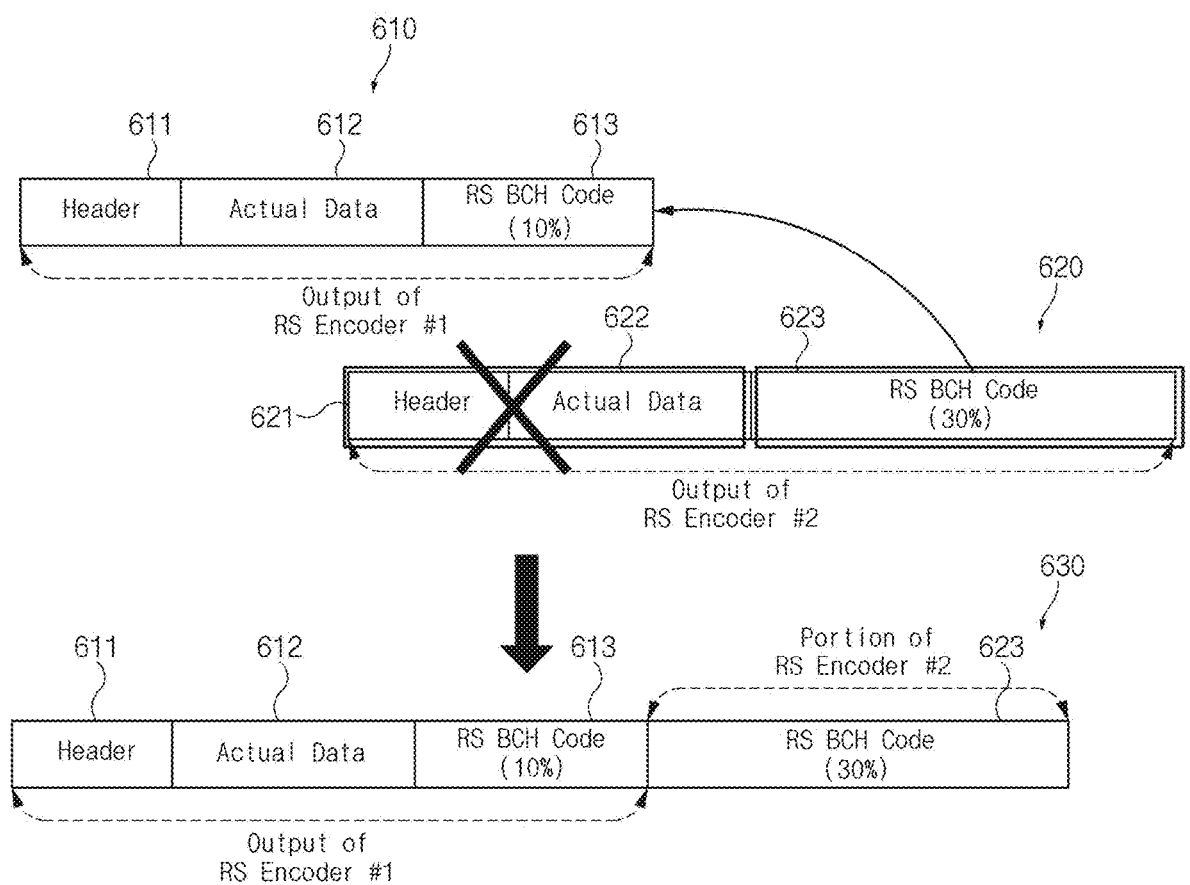
FIG. 6 shows combination of first encoded data and second encoded data in a keyboard processor according to an embodiment of the disclosure.

FIG. 6 shows combination of first encoded data and second encoded data in a keyboard processor according to an embodiment of the disclosure.

Referring to FIGS. 5 and 6, the first encoder 363 of the keyboard processor 360 may generate first encoded data 610 having a first error correction rate based on data about key input. The first encoded data 610 may include a header 611, key data 612, and a first error correction code 613. The first error correction code 613 may be a Reed Solomon (RS) code set to have a relatively low first error correction rate (e.g., 10%).

The second encoder 364 of the keyboard processor 360 may generate second encoded data 620 having a second error correction rate based on data about key input. The second encoded data 620 may include a header 621, key data 622, and a second error correction code 623. The header 621 and the key data 622 of the second encoded data 620 may be the same as the header 611 and the key data 612 of the first encoded data 610, respectively. The second error correction code 623 may be a Reed Solomon (RS) code set to have a relatively high second error correction rate (e.g., 30%).

The combiner 365 of the keyboard processor 360 may generate input data 630 by combining the first encoded data 610 and the second encoded data 620. The combiner 365 may remove the header 621 and the key data 622 and separate the second error correction code 623, from the second encoded data 620. The combiner 365 may generate the input data 630 by combining the first encoded data 610 and the second error correction code 623 of the second encoded data 620. Accordingly, the input data 630 may include the header 611, the key data 612, the first error correction code 613, and the second error correction code 623.

The combiner 365 may transmit the input data 630 to the terminal processor 310 through 1-wire communication. The terminal processor 310 may determine the validity of the key value using the first error correction code 613 and the second error correction code 623. The terminal processor 310 may receive input data and primarily determine the validity of the key value using the first error correction code 613. When the key value using the first error correction code 613 is invalid, the terminal processor 310 may determine the validity of the key value using the second error correction code 623. Additional information regarding operations of the terminal processor 310 may be provided through FIG. 7.

Figure 7:
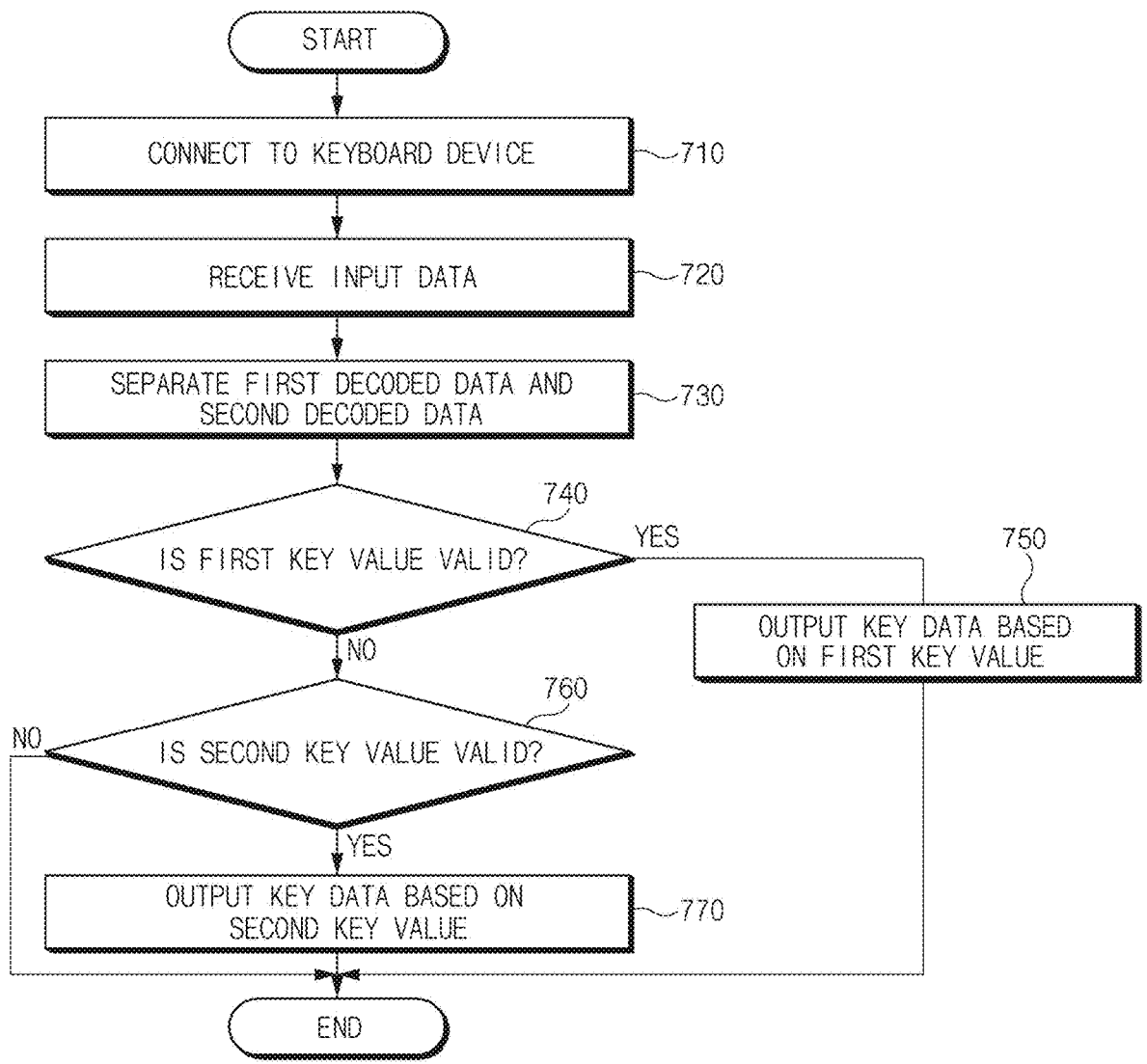
FIG. 7 is a flowchart showing operations of a terminal processor according to an embodiment of the disclosure.

FIG. 7 is a flowchart showing operations of a terminal processor according to an embodiment of the disclosure.

Referring to FIGS. 2, 5, and 7, in operation 710, the terminal processor 310 may check whether the electronic device 201 is electrically connected to the keyboard device 202. For example, in FIG. 2, when the first coupling member 210 and the second coupling member 260 are coupled, the first power terminal 220, the first ground terminal 230, and the first communication terminal 240 may be in contact with the second power terminal 270, the second ground terminal 280 and the second communication terminal 290, respectively. The terminal processor 310 may perform 1-wire communication with the keyboard processor 360 of the keyboard device 302 through the first communication terminal 240 and the second communication terminal 290.

In operation 720, when the electronic device 201 is electrically connected to the keyboard device 202, the terminal processor 310 may receive input data from the keyboard device 202. The input data may be data in which both a first error correction rate and a second error correction rate are reflected.

In operation 730, the terminal processor 310 may generate first data obtained by maintaining a first error correction code corresponding to the first error correction rate in the input data and removing a second error correction code corresponding to the second error correction rate from the input data. In addition, the terminal processor 310 may generate second data obtained by removing the first error correction code from the input data and maintaining the second error correction code in the input data. The first error correction code may correspond to the first error correction rate (e.g., 10%). The second error correction code may correspond to the second error correction rate (e.g., 30%). A process of generating the first data and the second data using the Reed Solomon (RS) code may be a simple cutting operation, and a processing time thereof may be relatively fast.

According to one embodiment of the disclosure, the terminal processor 310 may sequentially generate the first data and the second data, or may simultaneously generate the first data and the second data through multitasking/multiprocessing. For example, the terminal processor 310 may perform an operation of separating the second error correction code while decoding is performed for first error correction code.

In operation 740, the terminal processor 310 may decode the first error correction code to check whether a key value (hereinafter referred to as a first key value) based on the first data is valid.

In operation 750, when the first key value is valid (YES in operation 740), the terminal processor 310 may output key data corresponding to the first key value to the display 330 within a specified time interval.

In operation 760, when the first key value is invalid (NO in operation 740), the terminal processor 310 may decode the second error correction code to check whether a key value (hereinafter referred to as a second key value) based on the second data is valid.

In operation 770, when the second key value is valid (YES in operation 760), the terminal processor 310 may output key data corresponding to the second key value to the display 330 within a specified time interval.

According to one embodiment of the disclosure, when the second key value is invalid (NO in operation 760), no separate operation may be performed. Alternatively, the terminal processor 310 may generate a user notification or wait for the next input without a separate user notification.

Figure 8:
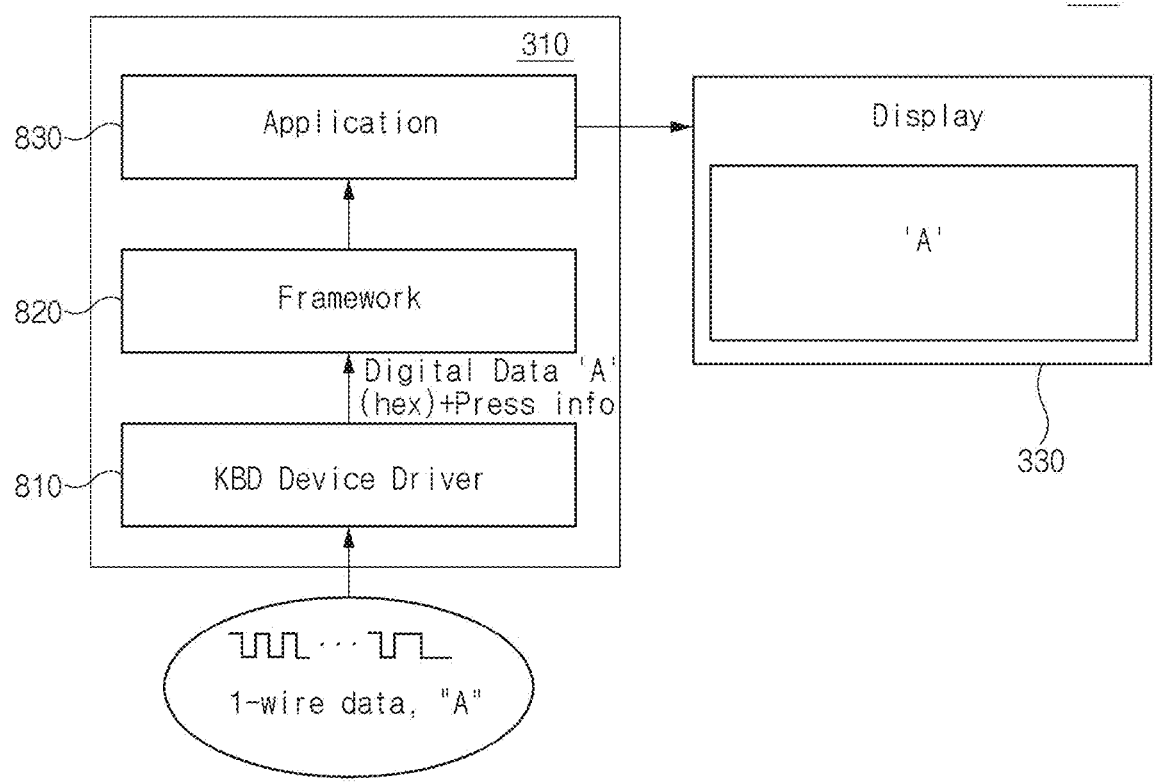
FIG. 8 illustrates processing of input data within an electronic device according to an embodiment of the disclosure.

FIG. 8 illustrates processing of input data within an electronic device according to an embodiment of the disclosure.

Referring to FIG. 8, the terminal processor 310 may include a keyboard device driver 810, a framework 820, and an application 830.

The keyboard device driver 810 may perform a communication interface with the keyboard device 202. The keyboard device driver 810 may receive input data in which the first error correction rate and the second error correction rate are reflected from the keyboard device 202.

The framework 820 may include classes and libraries for the operation of the application 830.

The application 830 may process the input data transmitted from the framework 820 and output text corresponding to the input data on the display. The application 830 may receive the input data, primarily process the key input by reflecting the first error correction rate (e.g., 10%), and secondarily process the key input by reflecting the second error correction rate (e.g., 30%) when a key value according to the first error correction rate is invalid.

According to one embodiment of the disclosure, at least some operations related to processing of the input data may be performed through the keyboard device driver 810 or the framework 820.

Figure 9:
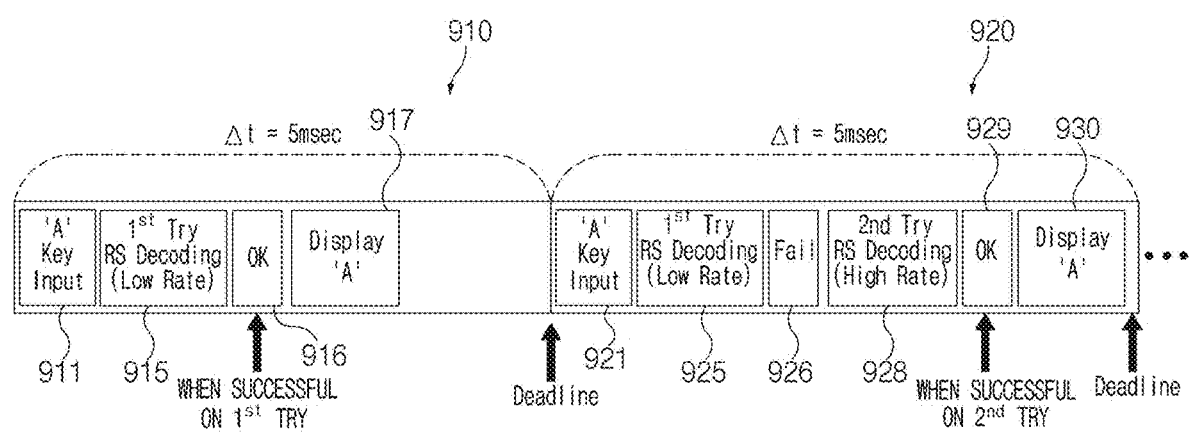
FIG. 9 illustrates a time window of a terminal processor according to an embodiment of the disclosure.

FIG. 9 illustrates a time window of a terminal processor according to an embodiment of the disclosure.

Referring to FIG. 9, the terminal processor 310 may set a time window Δt related to a limit on the time for processing a key input. For example, the time window Δt may be set to 5 ms.

In a first time window 910, when a key input occurs on the keyboard device 202 (911), the terminal processor 310 may receive input data corresponding to the key input. The terminal processor 310 may check whether a first key value is valid by decoding a first error correction code in the input data (915). When the first key value is valid (916), the terminal processor 310 may output the first key value (917).

In a second time window 920, when a key input occurs on the keyboard device 202 (921), the terminal processor 310 may receive input data corresponding to the key input. The terminal processor 310 may check whether the first key value is valid by decoding a first error correction code in the input data (925). When the first key value is invalid (926), the terminal processor 310 may check whether a second key value is valid by decoding a second error correction code (928). When the second key value is valid (929), the second key value may be output (930).

According to one embodiment of the disclosure, the terminal processor 310 may set a first error correction rate and a second error correction rate so that the output of the key value by the first error correction code or the second error correction code may be performed within a specified time window (e.g., 5 ms). For example, when the Reed Solomon (RS) code order increases, the error correction rate may increase, but the decoding time may become longer. When the Reed Solomon (RS) code order decreases, the error correction rate may decrease, but the decoding time may become shorter. The first error correction rate and the second error correction rate may be set by reflecting the encoding speed of the specified keyboard device 202 and the decoding speed of the electronic device 101.

According to one embodiment of the disclosure, the terminal processor 310 or the keyboard processor 360 may dynamically change the first error correction rate and the second error correction rate according to a specified power-related event.

For example, when the possibility of electric fast transient (EFT)/burst occurring is low or the number of output changes of the voltage comparator 370 during a specified time is less than a specified value, the terminal processor 310 or the keyboard processor 360 may reflect the first error correction rate and process the key input without reflecting the second error correction rate. In this way, the processing time for the key input may be reduced.

For another example, when a fast charger is connected, or when the number of output changes of the voltage comparator 370 during a specified time is equal to or greater than a specified value, the terminal processor 310 or the keyboard processor 360 may process the key input by reflecting both the first error correction rate and the second error correction rate. In this case, the first error correction rate and the second error correction rate may be set to a level capable of being performed within the specified time window (e.g., 5 ms).

According to one embodiment of the disclosure, the terminal processor 310 or the keyboard processor 360 may predefine and store a mutual protocol for generating and processing the input data. For example, the mutual protocol may include 1) the total length of 1-wire data, 2) polynomial configuration information of the Reed Solomon (RS) encoder, and 3) the length of error correction data. The terminal processor 310 or the keyboard processor 360 may update the mutual protocol in real time according to a situation of electric fast transient (EFT)/burst occurrence.

Figure 10:
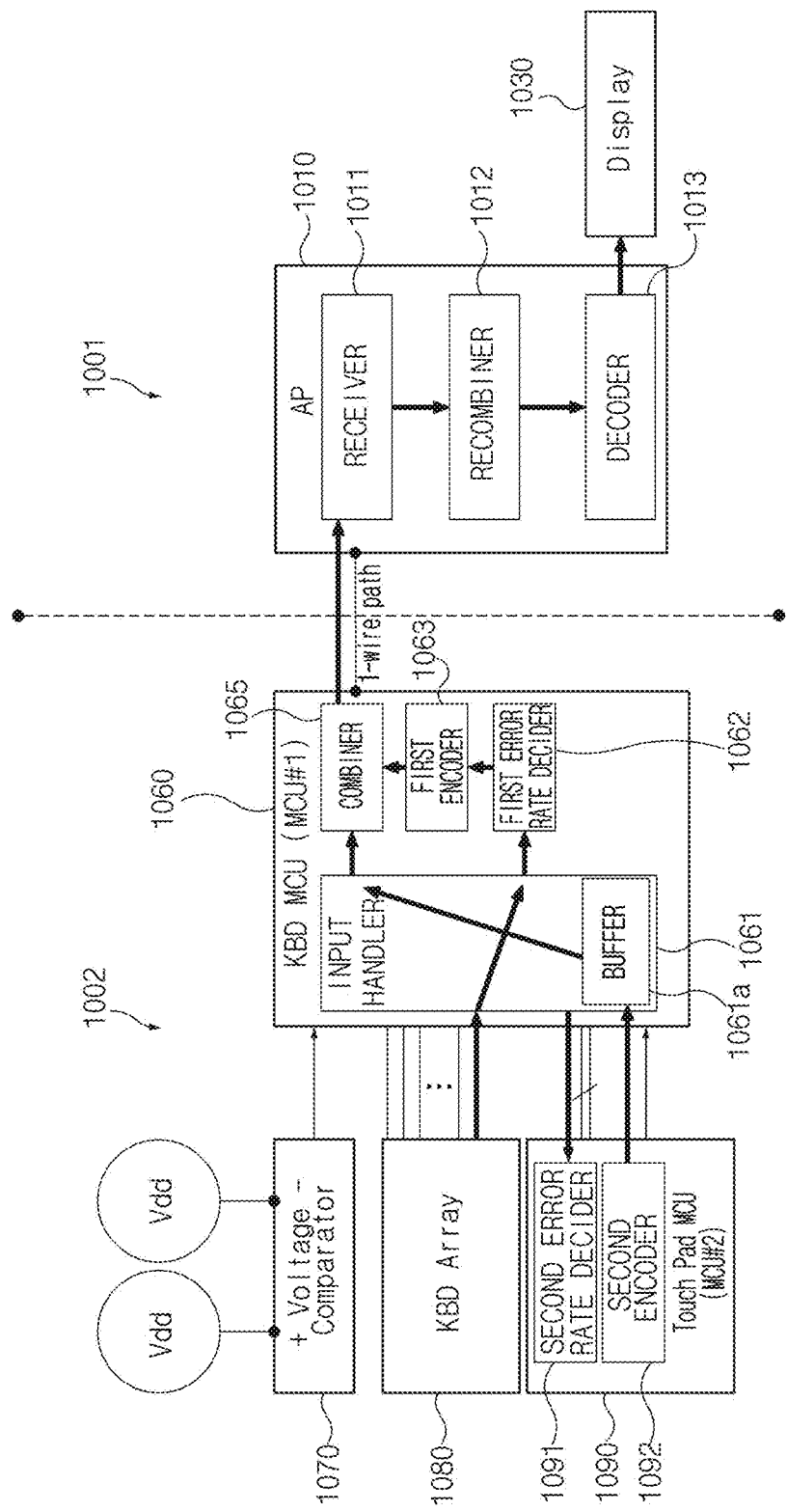
FIG. 10 is a block diagram of an electronic device and a keyboard device including a touch pad according to an embodiment of the disclosure.

FIG. 10 is a block diagram of an electronic device and a keyboard device including a touch pad according to an embodiment of the disclosure.

Referring to FIG. 10, a keyboard device 1002 may include a keyboard processor 1060, a voltage comparator 1070, a key array 1080, and a processor for touch pads (hereinafter referred to as a touch pad processor) 1090.

The keyboard processor 1060 may include an input handler 1061, a first error rate decider (or first correction rate decider) 1062, a first encoder 1063, and a combiner 1065. The internal components of the keyboard processor 1060 may be classified in terms of software.

The input handler 1061 may perform an interface with the key array 1080 or the touch pad processor 1090. For example, the input handler 1061 may receive data about a key input from the key array 1080 or receive data about a touch input from the touch pad processor 1090.

When a key input occurs in the key array 1080, the input handler 1061 may receive key data from the key array 1080. The input handler 1061 may transmit the received key data to the first encoder 1063 through the first error rate decider 1062. In addition, the input handler 1061 may transmit the received key data to a second encoder 1092 of the touch pad processor 1090 through a second error rate decider (or second correction rate decider) 1091. The first encoder 1063 may generate first encoded data having a first error correction rate, and the second encoder 1092 of the touch pad processor 1090 may generate second encoded data having a second error correction rate. For example, the first error correction rate may be 10% and the second error correction rate may be 30%. The first encoder 1063 of the keyboard processor 1060 and the second encoder 1092 of the touch pad processor 1090 may be included in different processors to independently operate. Accordingly, the encoding process may be simultaneously performed, and compared to FIG. 4, the encoding time may be reduced by up to ½.

According to one embodiment of the disclosure, the input handler 1061 may include a buffer 1061a for storing the second encoded data. The buffer 1061a may temporarily store the second encoded data generated by the touch pad processor 1090.

The first error rate decider (or first correction rate decider) 1062 may decide the first error correction rate to be applied to the first encoder 1063. The first error rate decider 1062 may decide the order of the polynomial applied to RS coding. The first error correction rate may be set through the keyboard processor 1060's own operation or a control signal received from a terminal processor 1010.

The first encoder 1063 may generate the first encoded data having the first error correction rate based on the key data. For example, the first error correction rate may be a relatively low value (e.g., 10%).

The touch pad processor 1090 may perform operations related to receiving a touch input. For example, the touch pad processor 1090 may be a micro control unit (MCU). The touch pad processor 1090 may include the second error rate decider (or second correction rate decider) 1091 and the second encoder 1092. The internal components of the touch pad processor 1090 may be classified in terms of software.

The touch pad processor 1090 may not perform processing related to the touch input while a key input occurs. Accordingly, the touch pad processor 1090 may perform an operation to generate the second encoded data while the key input occurs.

The second error rate decider (or second correction rate decider) 1091 may decide the second error correction rate to be applied to the second encoder 1092. The second error rate decider 1091 may decide the order of the polynomial applied to RS coding. The second error correction rate may be set through the touch pad processor 1090's own operation or a control signal received from the keyboard processor 1060 or the terminal processor 1010.

The second encoder 1092 may generate the second encoded data having the first error correction rate based on the key data. For example, the second error correction rate may be a relatively high value (e.g., 30%). The second encoder 1092 may transmit the second encoded data to the input handler 1061. The input handler 1061 may store the second encoded data in the buffer 1061*a*.

The combiner (or transmitter) 1065 may generate input data by combining the first encoded data having the first error correction rate and the second encoded data having the second error correction rate. The combiner 1065 may use the second encoded data stored in the buffer 1061*a* of the input handler 1061.

For example, the combiner 1065 may separate an error correction code excluding a header and key data in the second encoded data. The combiner 1065 may generate input data by combining the error correction codes of the first encoded data and the second encoded data.

The combiner 1065 may transmit the generated input data to the terminal processor 1010 through 1-wire communication.

The terminal processor 1010 may include a receiver 1011, a recombiner 1012, and a decoder 1013 connected to a display 1030. The internal components of the terminal processor 1010 may be classified in terms of software. The operation of each component of the terminal processor 1010 may be the same as or similar to the operation of the corresponding component in FIG. 4.

Figure 11:
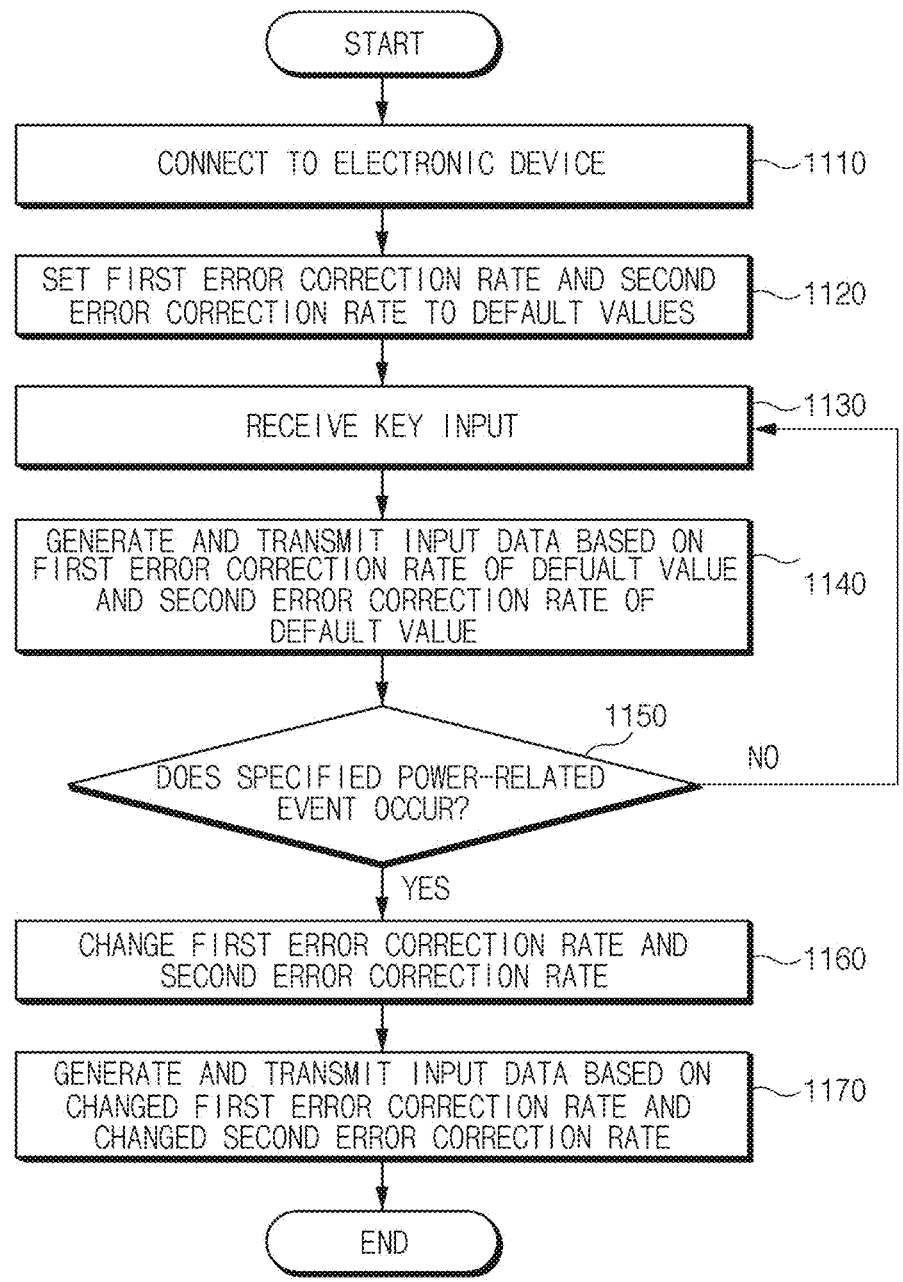
FIG. 11 is a flowchart showing a dynamic change of an error correction rate according to an embodiment of the disclosure.

FIG. 11 is a flowchart showing dynamic change of an error correction rate according to an embodiment of the disclosure.

Referring to FIGS. 10 and 11, in operation 1110, the keyboard processor 1060 may check whether the keyboard device 1002 is electrically connected to an electronic device 1001. The keyboard processor 1060 may be in a state capable of performing 1-wire communication with the terminal processor 1010 of the electronic device 1001.

In operation 1120, the keyboard processor 1060 may set a first error correction rate and a second error correction rate to preset default values, respectively. For example, the first error correction rate may be 10% and the second error correction rate may be 30%.

In operation 1130, the keyboard processor 1060 may receive a key input from the key array 1080.

In operation 1140, the keyboard processor 1060 may generate input data based on the first error correction rate of a first default value (e.g., 10%) and the second error correction rate of a second default value (e.g., 30%), and transmit the generated input data to the terminal processor 1010.

In operation 1150, the keyboard processor 1060 may check whether a specified power-related event occurs. The specified power-related event may be an event in which the possibility of an electric fast transient (EFT)/burst occurring is high. Examples of the specified power-related event may include a case in which the number of output changes of the voltage comparator 1070 within a unit time (e.g., 1 minute) is equal to or greater than a specified value, a case in which a fast charger is connected to the electronic device 1001, and a case in which abnormal operation of the PMIC is detected.

According to one embodiment of the disclosure, the keyboard processor 1060 may check whether the specified power-related event occurs based on self-detecting (detecting the output of the voltage comparator 1070) or a control signal transmitted from the terminal processor 1010 (e.g., fast charger connection, PMIC abnormality).

When the specified power-related event does not occur, the keyboard processor 1060 may process the key input based on the first error correction rate of the first default value (e.g., 10%) and the second error correction rate of the second default value (e.g., 30%).

In operation 1160, when the specified power-related event occurs, the keyboard processor 1060 may change the first error correction rate and the second error correction rate. For example, the keyboard processor 1060 may cause the first error rate decider 1062 and the second error rate decider 1091 of FIG. 10 to change the error correction rates.

According to one embodiment of the disclosure, the first error correction rate and the second error correction rate may vary depending on each event. For example, when the number of output changes of the voltage comparator 1070 during a specified time is equal to or greater than a specified value, the first error correction rate may be changed from 10%, which is the first default value, to 20%, and the second error correction rate may be changed from 30%, which is the second default value, to 40%. For another example, when a fast charger is connected to the electronic device 1001, the first error correction rate may be changed from 10%, which is the first default value, to 30%, and the second error correction rate may be changed from 30%, which is the second default value, to 50%. For still another example, when the number of output changes of the voltage comparator 1070 does not occur during the specified time, the first error correction rate may be set to be lower than the first default value, and the second error correction rate may be set to be lower than the second default value.

In operation 1170, the keyboard processor 1060 may generate input data based on the changed first error correction rate and the changed second error correction rate and transmit the generated input data to the terminal processor 1010.

According to one embodiment of the disclosure, even after the first error correction rate and the second error correction rate are changed, the keyboard processor 1060 may change the first error correction rate and the second error correction rate in real time according to a control signal transmitted from itself or the terminal processor 1010.

In FIG. 11, the change of the first error correction rate and the second error correction rate according to the occurrence of the specified power-related event is shown as an example, but is not limited thereto. The first error correction rate and the second error correction rate may be changed regardless of the occurrence of the power-related event. For example, the terminal processor 1010 or the keyboard processor 1060 may change the first error correction rate and the second error correction rate depending on conditions such as a change of the state of the electronic device 1001, a change of the state of the keyboard device 1002, or an increase or decrease in the number of detections of contamination of key data.

Figure 12:
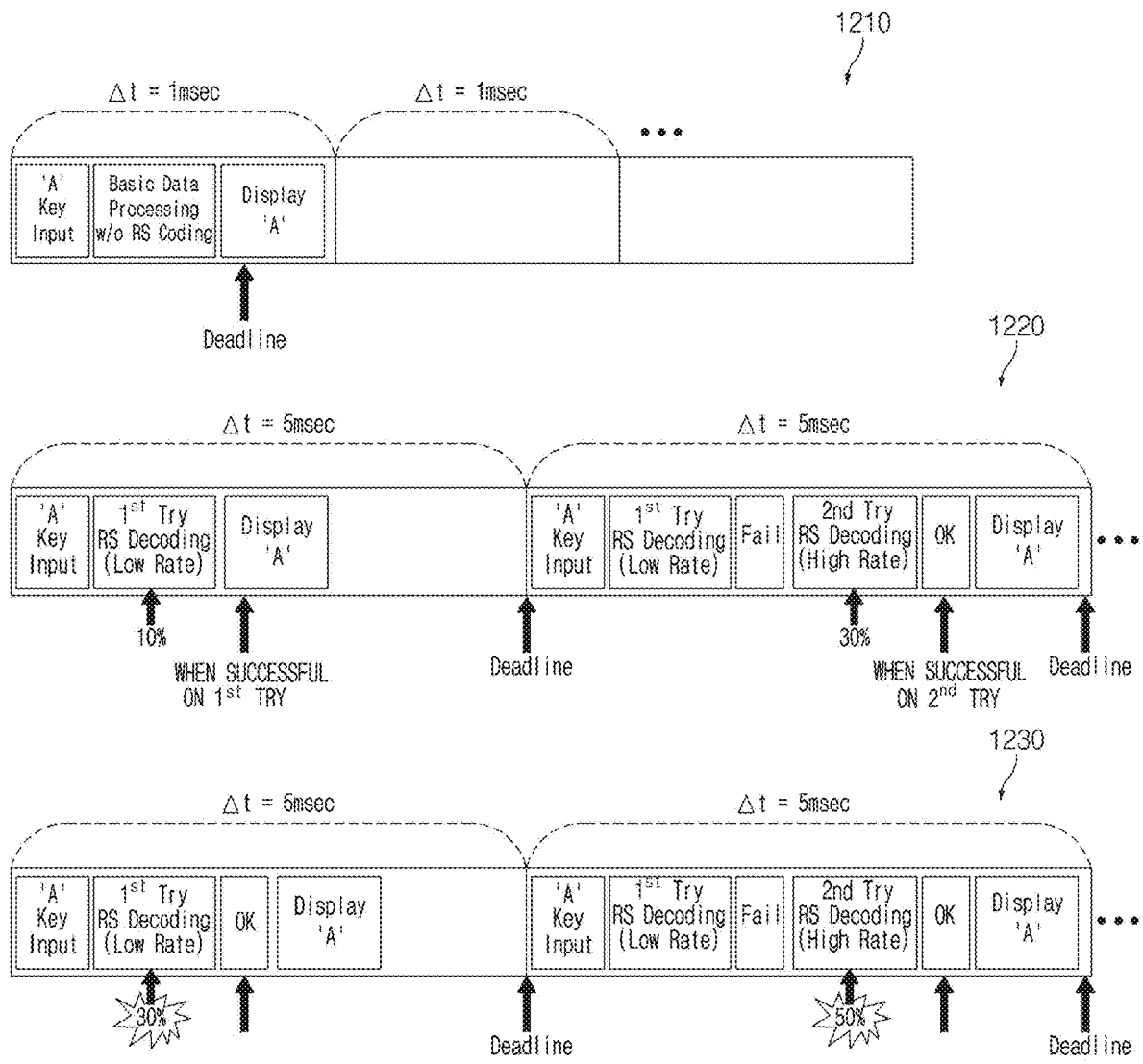
FIG. 12 shows dynamic changes of an error correction rate and a time window according to an embodiment of the disclosure.

FIG. 12 shows dynamic changes of an error correction rate and a time window according to an embodiment of the disclosure.

Referring to FIG. 12, the terminal processor 1010 or the keyboard processor 1060 may dynamically change the first error correction rate, the second error correction rate, and the size of the time window.

A first state 1210 may be a default setting state or a state in which electric fast transient (EFT)/burst does not occur for a specified time or longer. In the first state 1210, the terminal processor 1010 or the keyboard processor 1060 may display a key value without processing an error correction code. In this case, the time window Δt may be set to a relatively short first time (e.g., 1 ms).

A second state 1220 may be a state in which the possibility of electric fast transient (EFT)/burst occurring is relatively normal. For example, the second state 1220 may be a state in which the output of the voltage comparator changes less than a specified number of times for a specified time. In the second state 1220, the terminal processor 1010 or the keyboard processor 1060 may set the first error correction rate to 10% and the second error correction rate to 30%.

The terminal processor 1010 may primarily display the key value based on the first error correction rate and secondarily display the key value based on the second error correction rate when the key value is invalid. In this case, the time window Δt may be set to a relatively long second time (e.g., 5 ms).

A third state 1230 may be a state in which the possibility of electric fast transient (EFT)/burst occurring is relatively high. For example, the third state 1230 may be a state in which the output of the voltage comparator changes a specified number of times or more for a specified time. In the third state 1230, the terminal processor 1010 or the keyboard processor 1060 may set the first error correction rate to 30% and the second error correction rate to 50%.

The terminal processor 1010 may primarily display the key value based on the first error correction rate and secondarily display the key value based on the second error correction rate when the key value is invalid. In this case, the time window Δt may be set to a relatively long second time (e.g., 5 ms).

Figure 13:
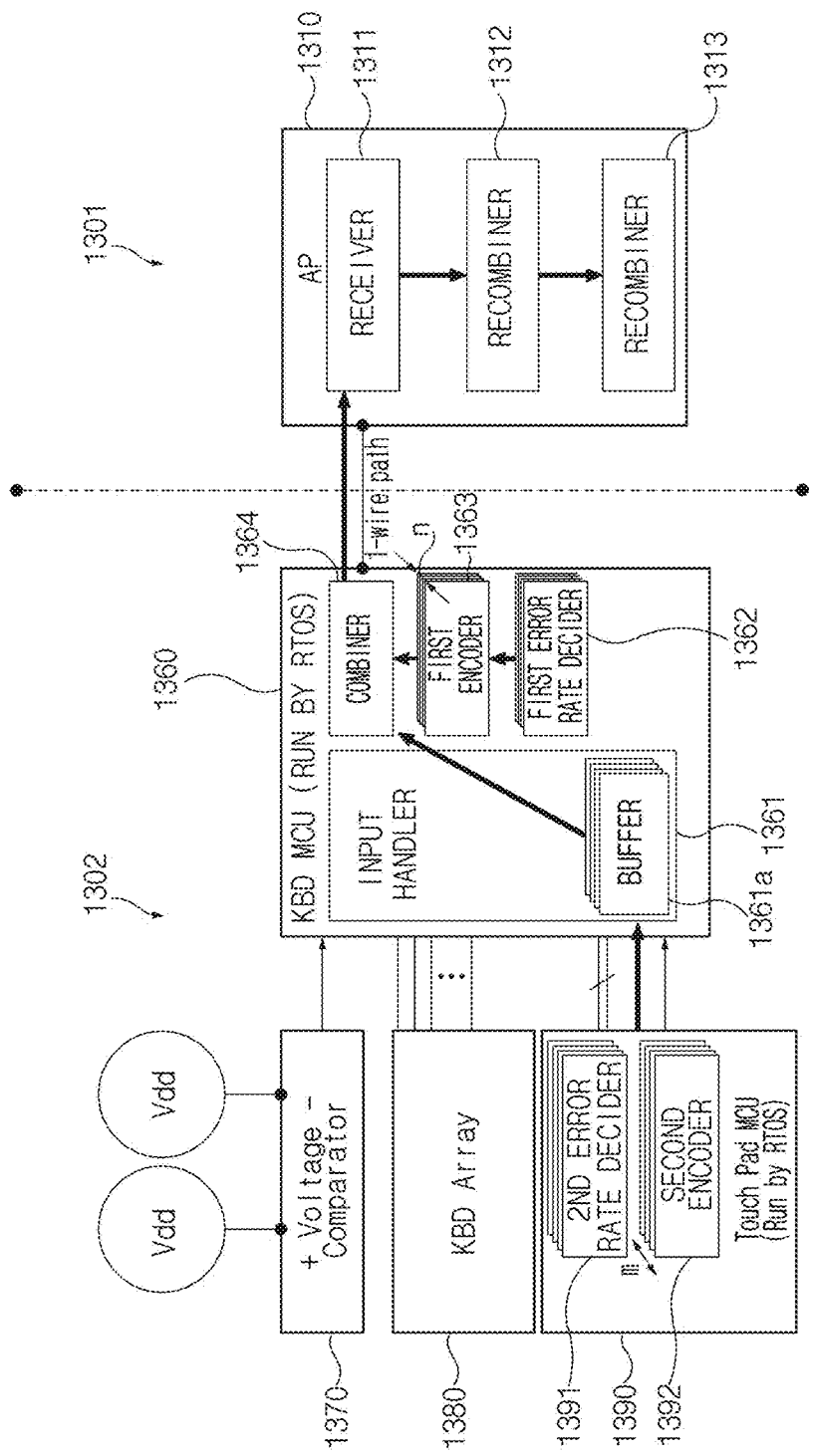
FIG. 13 is a block diagram of a keyboard device to which a real time operating system (RTOS) is applied according to an embodiment of the disclosure.

FIG. 13 is a block diagram 1301 of a keyboard device to which a real time operating system (RTOS) is applied according to an embodiment of the disclosure.

Referring to FIG. 13, a keyboard device 1302 may include a keyboard processor 1360, a voltage comparator 1370, a key array 1380, and a touch pad processor 1390. The keyboard processor 1360 may include an input handler 1361, a first error rate decider 1362, a first encoder 1363, and a combiner 1364. The touch pad processor 1390 may include a second error rate decider 1391 and a second encoder 1392. The operation of components in FIG. 13 may be the same as or similar to the operation of the corresponding components in FIG. 10.

The keyboard processor 1360 and the touch pad processor 1390 may each be high-specification MCUs capable of being equipped with a real time operating system (RTOS). At least some of the components included in the keyboard processor 1360 and the touch pad processor 1390 may be capable of parallel processing of data.

The keyboard processor 1360 may generate input data by sequentially combining error correction codes having various error correction rates.

A terminal processor 1310 may include a receiver 1311, a recombiner 1312, and a decoder 1313. The operation of each component of the terminal processor 1310 may be the same as or similar to the operation of the corresponding component in FIG. 4.

The terminal processor 1310 may receive input data in which error correction codes having various error correction rates are sequentially combined. The terminal processor 1310 may decide a level to apply the error correction rate according to various key input or power-related situations or conditions and output the key input.

Figure 14:
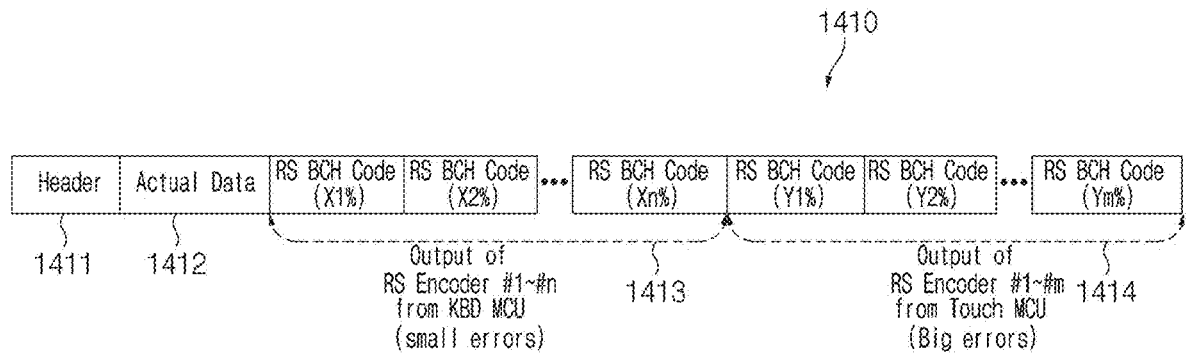
FIG. 14 illustrates input data generated by a keyboard processor to which an RTOS is applied according to an embodiment of the disclosure.

FIG. 14 illustrates input data generated by the keyboard processor to which an RTOS is applied according to an embodiment of the disclosure.

Referring to FIGS. 13 and 14, the keyboard processor 1360 may generate input data 1410 by sequentially combining error correction codes having various error correction rates.

The input data 1410 may include a header 1411, key data 1412, a first error correction code 1413, and a second error correction code 1414.

The first error correction code 1413 may be generated in the first encoder 1363 of the keyboard processor 1360. The first error correction code 1413 may be set so that a relatively small error correction rate sequentially increases.

The second error correction code 1414 may be generated in the second encoder 1392 of the touch pad processor 1390. The second error correction code 1414 may be set so that a relatively large error correction rate sequentially increases.

The terminal processor 1310 may receive the input data 1410. The terminal processor 1310 may decide a level to apply the error correction rate according to various key input or power-related situations or conditions and output the key input. For example, when a fast charger is not connected, the terminal processor 1310 may output the key input using at least a portion of the first error correction code 1413. For another example, when a fast charger is connected, the terminal processor 1310 may output the key input using at least a portion of the second error correction code 1414. In this way, the terminal processor 1310 may have flexible error correction capabilities in unpredictable EFT/B situations.

The electronic device may be electrically connected to the keyboard device through the power terminal and the communication terminal. When electric fast transient (EFT)/burst related to power is applied to the keyboard device at an arbitrary time, both the power terminals of the electronic device and the keyboard device may momentarily become unstable. Accordingly, serious errors in data related to key input may occur. For example, when a specific key is pressed and released, the key input may remain pressed and the key may be continuously output on the display. For another example, when a certain key is pressed, the corresponding key may not appear on the display.

According to one embodiment of the disclosure, the keyboard device may be connected to an external electronic device. The keyboard device may include a key array, a power terminal, a communication terminal, a ground terminal, and at least one processor. The processor may detect electrical connection to the external electronic device through the power terminal, the communication terminal, and the ground terminal. The processor, when electrically connected to the external electronic device, may receive a key input through the key array. The processor, in response to the key input, may generate first encoded data having a first error correction rate and second encoded data having a second error correction rate greater than the first error correction rate. The processor may combine the first encoded data and the second encoded data to generate input data. The processor may transmit the input data to the external electronic device through the communication terminal.

According to one embodiment of the disclosure, the keyboard device may further include a touch pad detecting a touch input. The at least one processor may include a first processor configured to process the key input through the array and a second processor configured to process the touch input through the touch pad.

According to one embodiment of the disclosure, the first processor may generate the first encoded data. The second processor may generate the second encoded data.

According to one embodiment of the disclosure, the at least one processor may generate the first encoded data and the second encoded data according to a specified coding technique in which original data is preserved.

According to one embodiment of the disclosure, the at least one processor may generate the first encoded data including a header, key data corresponding to the key input, and a first error correction code corresponding to the first error correction rate. The at least one processor may generate the second encoded data including the header, the key data, and a second error correction code corresponding to the second error correction rate.

According to one embodiment of the disclosure, the at least one processor may generate the input data including the header, the key data, the first error correction code, and the second error correction code.

According to one embodiment of the disclosure, the keyboard device may further include a voltage comparator using a power signal transmitted through the power terminal as a first input and using a signal obtained by inverting the power signal as a second input.

According to one embodiment of the disclosure, the at least one processor may adjust the first error correction rate and the second error correction rate based on an output of the voltage comparator.

According to one embodiment of the disclosure, the keyboard device may further include a touch pad detecting a touch input. The at least one processor may include a first processor of a real time operating system (RTOS) processing the key input through the array and a second processor of a real time operating system (RTOS) processing the touch input through the touch pad.

According to one embodiment of the disclosure, the at least one processor may adjust the first error correction rate and the second error correction rate based on a control signal transmitted from the external electronic device.

According to one embodiment of the disclosure, the at least one processor may receive the control signal when a power device is connected to the external electronic device.

An electronic device according to one embodiment may be connectable to an external keyboard device. The electronic device may include a display, a power terminal, a communication terminal, a ground terminal, and at least one processor. The at least one processor may detect electrical connection to the external keyboard device through the power terminal, the communication terminal, and the ground terminal. The at least one processor, when electrically connected to the external keyboard device, may receive input data from the external keyboard device. The at least one processor may separate a first error correction code having a first error correction rate and a second error correction code having a second error correction rate from the input data. The at least one processor, within a specified time interval, may decode the first error correction code and output key data based on first data when a first key value is valid. The at least one processor may output key data based on second data within the specified time interval when the first key value is invalid.

According to one embodiment of the disclosure, the at least one processor may generate the first data by combining a header of the input data, the key data, and the first error correction code.

The at least one processor may generate the second data by combining the header of the input data, the key data, and the second error correction code.

According to one embodiment of the disclosure, the at least one processor may transmit a control signal to change the first error correction rate or the second error correction rate based on a power-related event to the external keyboard device.

According to one embodiment of the disclosure, the at least one processor may transmit the control signal to the external keyboard device when an external power device is connected.

According to one embodiment of the disclosure, the electronic device may further include a power management circuit. The at least one processor may transmit the control signal to the external keyboard device when an abnormal operation of the power management circuit is detected.

According to one embodiment of the disclosure, the at least one processor may change the specified time interval when the first error correction rate or the second error correction rate is changed.

According to one embodiment of the disclosure, the at least one processor, within a specified time interval, may decode the second error correction code and output key data based on second data when a second key value is valid.

According to one embodiment of the disclosure, the at least one processor may be configured to wait for the specified time interval to elapse when the second key value is invalid.

The keyboard device according to embodiments disclosed herein may prevent key input errors caused by EFT/burst by using data having a plurality of different error correction rates.

The keyboard device according to embodiments disclosed herein may generate data having a plurality of different error correction rates using a plurality of processors.

The keyboard device or electronic device according to embodiments disclosed herein may dynamically change the error correction rate for key input depending on the possibility of electric fast transient (EFT)/burst occurring. In this way, key input errors due to electric fast transient (EFT)/burst may be effectively corrected.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A keyboard device comprising:
a key array;
a power terminal;
a communication terminal;
a ground terminal;
memory storing one or more computer programs; and
one or more processors communicatively coupled to the key array, the power terminal, the communication terminal, the ground terminal, and the memory,
wherein the one or more computer programs include computer-executable instructions that, when executed by the one or more processors individually or collectively, cause the keyboard device to:
detect electrical connection to an external electronic device through the power terminal, the communication terminal, and the ground terminal,
when electrically connected to the external electronic device, receive a key input through the key array,
in response to the key input, generate first encoded data having a first error correction rate and second encoded data having a second error correction rate greater than the first error correction rate, combine the first encoded data and the second encoded data to generate input data, and transmit the input data to the external electronic device through the communication terminal.

2. The keyboard device of claim 1, further comprising:
a touch pad detecting a touch input,
wherein the one or more processors includes:
   a first processor configured to process the key input through the array, and
   a second processor configured to process the touch input through the touch pad.

3. The keyboard device of claim 2,
wherein the first processor configured to generate the first encoded data, and
wherein the second processor configured to generate the second encoded data.

4. The keyboard device of claim 1, wherein the one or more computer programs further include computer-executable instructions that, when executed by the one or more processors individually or collectively, cause the keyboard device to generate the first encoded data and the second encoded data according to a specified coding technique in which original data is preserved.

5. The keyboard device of claim 1, wherein the one or more computer programs further include computer-executable instructions that, when executed by the one or more processors individually or collectively, cause the keyboard device to:
   generate the first encoded data including a header, key data corresponding to the key input, and a first error correction code corresponding to the first error correction rate, and
   generate the second encoded data including the header, the key data, and a second error correction code corresponding to the second error correction rate.

6. The keyboard device of claim 5, wherein the one or more computer programs further include computer-executable instructions that, when executed by the one or more processors individually or collectively, cause the keyboard device to generate the input data including the header, the key data, the first error correction code, and the second error correction code.

7. The keyboard device of claim 1, further comprising:
a voltage comparator using a power signal transmitted through the power terminal as a first input and using a signal obtained by inverting the power signal as a second input.

8. The keyboard device of claim 7, wherein the one or more computer programs further include computer-executable instructions that, when executed by the one or more processors individually or collectively, cause the keyboard device to adjust the first error correction rate and the second error correction rate based on an output of the voltage comparator.

9. The keyboard device of claim 1, further comprising:
a touch pad detecting a touch input,
wherein the one or more processors includes:
   a first processor of a real time operating system (RTOS) processing the key input through the array, and
   a second processor of a real time operating system (RTOS) processing the touch input through the touch pad.

10. The keyboard device of claim 1, wherein the one or more computer programs further include computer-executable instructions that, when executed by the one or more processors individually or collectively, cause the keyboard device to adjust the first error correction rate and the second error correction rate based on a control signal transmitted from the external electronic device.

11. The keyboard device of claim 10, wherein the one or more computer programs further include computer-executable instructions that, when executed by the one or more processors individually or collectively, cause the keyboard device to receive the control signal when a power device is connected to the external electronic device.

12. An electronic device comprising:
a display;
a power terminal;
a communication terminal;
a ground terminal;
memory storing one or more computer programs; and
one or more processors communicatively coupled to the display, the power terminal, the communication terminal, the ground terminal, and the memory,
wherein the one or more computer programs include computer-executable instructions that, when executed by the one or more processors individually or collectively, cause the electronic device to:
   detect electrical connection to an external keyboard device through the power terminal, the communication terminal, and the ground terminal,
   when electrically connected to the external keyboard device, receive input data from the external keyboard device,
   separate a first error correction code having a first error correction rate and a second error correction code having a second error correction rate from the input data,
   within a specified time interval, decode the first error correction code and output key data based on first data when a first key value is valid, and
   output key data based on second data within the specified time interval when the first key value is invalid.

13. The electronic device of claim 12, wherein the one or more computer programs further include computer-executable instructions that, when executed by the one or more processors individually or collectively, cause the electronic device to generate the first data by combining a header of the input data, the key data, and the first error correction code.

14. The electronic device of claim 13, wherein the one or more computer programs further include computer-executable instructions that, when executed by the one or more processors individually or collectively, cause the electronic device to generate the second data by combining the header of the input data, the key data, and the second error correction code.

15. The electronic device of claim 12, wherein the one or more computer programs further include computer-executable instructions that, when executed by the one or more processors individually or collectively, cause the electronic device to transmit a control signal to change the first error correction rate or the second error correction rate based on a power-related event to the external keyboard device.

16. The electronic device of claim 15, wherein the one or more computer programs further include computer-executable instructions that, when executed by the one or more processors individually or collectively, cause the electronic device to transmit the control signal to the external keyboard device when an external power device is connected.

17. The electronic device of claim 15, further comprising:
a power management circuit, wherein the one or more computer programs further include computer-executable instructions that, when executed by the one or more processors individually or collectively, cause the electronic device to transmit the control signal to the external keyboard device when an abnormal operation of the power management circuit is detected.

18. The electronic device of claim 15, wherein the one or more computer programs further include computer-executable instructions that, when executed by the one or more processors individually or collectively, cause the electronic device to change the specified time interval when the first error correction rate or the second error correction rate is changed.

19. The electronic device of claim 12, wherein the one or more computer programs further include computer-executable instructions that, when executed by the one or more processors individually or collectively, cause the electronic device to, within the specified time interval, decode the second error correction code and output the key data based on the second data when a second key value is valid.

20. One or more non-transitory computer-readable storage media storing computer-executable instructions that, when executed by a processor individually or collectively, cause an electronic device to perform operations, the operations comprising:
  detecting electrical connection to an external keyboard device through a power terminal, a communication terminal, and a ground terminal;
  when electrically connected to the external keyboard device, receiving input data from the external keyboard device;
  separating a first error correction code having a first error correction rate and a second error correction code having a second error correction rate from the input data;
  within a specified time interval, decoding the first error correction code and output key data based on first data when a first key value is valid; and
  outputting key data based on second data within the specified time interval when the first key value is invalid.

* * * * *